United States Patent Office 3,136,686
Patented June 9, 1964

3,136,686
O,O-DIALKYL S-ALKENYL PHOSPHOROTHIO-
ATES AND INSECTICIDAL COMPOSITIONS
AND METHODS EMPLOYING SAME
Ernst Beriger, Allschwil, Switzerland, assignor to
Ciba Limited, Basel, Switzerland
No Drawing. Filed Oct. 13, 1959, Ser. No. 846,045
Claims priority, application Switzerland Oct. 31, 1958
21 Claims. (Cl. 167—22)

The present invention provides new organic phosphorus compounds of the general formula (I) 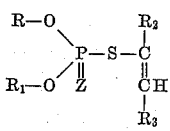

in which R and $R_1$ stand for lower alkyl groups, $R_2$ for a hydrogen atom or a lower alkyl group which may be interrupted by an ether or ester group, for an unsubstituted or substituted phenyl radical or for a radical —$COOR_4$ (in which $R_4$ represents an alkyl radical which may be interrupted by an ether oxygen atom), $R_3$ represents a lower alkyl group which is interrupted by an ether or ester group, or for an aldehyde group or a radical —$COOR_4$ (in which $R_4$ has the above meaning), and Z represents an oxygen or a sulfur atom. The compounds of the above formula possess good insecticidal properties.

The invention also provides a process for the manufacture of the compounds of the Formula I, wherein a compound of the general formula (II) 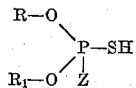

in which R, $R_1$ and Z have the above meanings, is additively combined with an acetylene derivative of the general formula (III) $R_2.C{\equiv}CR_3$ in which $R_2$ and $R_3$ have the above meanings. The radicals R and $R_1$ in the above formulae are lower alkyl groups that preferably contain 1 to 4 carbon atoms, such as the butyl, isopropyl or n-propyl group and more especially the ethyl or methyl group. As stated above the radical $R_2$ may represent a lower alkyl group interrupted by an ether or ester group. Such radicals are, for example, groups such as —$CH_2O$—$CH_3$ or —$CH_2OOCCH_3$. The same applies to the radical $R_3$. The radical $R_4$ may be interrupted by one or more ether oxygen atoms and should as a rule not contain more than 10 carbon atoms. The radicals $R_2$ and $R_3$ should as a rule not contain more than 12 carbon atoms each.

In the above Formulae I and II the symbol Z preferably represents sulfur, in which case the compounds are derivatives of dithiophosphoric acid.

The process of the invention may be carried out by heating the reactants, for example, at 50 to 100° C. and preferably at about 80° C., and it may be of advantage to dilute the reactants with a solvent, such as acetone, benzene or methylene chloride. It is of advantage to add a polymerization inhibitor, such as hydroquinone. Furthermore, a small proportion of a tertiary amine, such as triethylamine, pyridine and dimethylaniline, accelerates the reaction catalytically.

The compounds of the invention are, as stated above, valuable agents for combating pests, and more especially harmful insects. The new compounds are active against the various stages of development of insects, such as eggs, larvae and imagines, on which they act both as a contact poison and a stomach poison.

Accordingly, the present invention also includes pest-combating preparations, which comprise a compound of the Formula I in admixture with a solid or liquid diluent, and a process for combating pests with such preparations.

A very wide variety of substances can be protected against pests, and gaseous, liquid or solid substances are suitable as carriers for the active substances. Substances that can be protected in this manner or used as carriers are, for example, air, more especially in rooms, also liquids such, for example, as water in ponds, and finally any inanimate or living solid substratum such, for example, as objects in lived-in rooms, in cellars, in lofts, in stables; furthermore furs, feathers, wool and the like; also living beings of the vegetable and animal kingdoms, such as utilitarian plants, forests, domestic animals in their different stages of developments, insofar as they are not harmed by the pest-combating agents.

The pests are combated by the conventional methods, for example by treating the body to be protected with the new compound in vapor form, for example, as fumigating agent, or in the form of a dusting or spraying preparation, for example as a solution or suspension prepared with water or with a suitable organic solvent such as alcohol, petroleum, a tar distillate or the like. An aqueous solution, or an aqueous emulsion of an organic solvent, containing the active principle may be used for brushing, spraying or dipping the body to be protected.

The spraying and dusting preparations may contain the usual inert fillers or identifying agents, such as kaolin, gypsum or bentonite or further additives, such as sulfite cellulose waste liquor, cellulose derivatives or the like, and for improving the wetting and adhesive properties a conventional wetting agent and adhesive. The pest-combating agent may take the form of a powder, an aqueous dispersion or paste, or it may be a self-dispersing oil.

The new compounds may be the only active principle present in a pesticide, or it may be used in conjunction with other insecticides and/or fungicides. Such preparations are used for plant protection by the conventional spraying, casting, dusting or fumigating methods.

The following examples illustrate the invention, the relationship between parts by weight and parts by volume being the same as that between the kilogram and the liter.

*Example 1*

9.8 parts of tetrolic acid methyl ester are heated with stirring to 80° C. In the course of 15 minutes 15.8 parts of dimethyldithiophosphoric acid are added dropwise and the temperature is maintained for 3 hours longer at 80° C. The reaction product is allowed to cool, diluted with a small amount of chloroform and washed with 2 N-sodium carbonate solution. The chloroformic solution is then dried over calcium chloride and evaporated in vacuo. 9 parts of a pale-yellow, thinly liquid oil are obtained which can be distilled in a high vacuum. Boiling point 128 to 130° C. under a pressure of 0.02 mm. Hg. The product formed corresponds to the formula

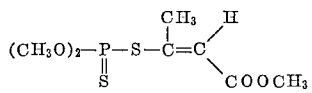

and displays little toxicity towards warm-blooded beings.

*Example 2*

2 parts of the condensation product obtained as described in Example 1 are mixed with 7 parts of isopropanol and with 1 part of the condensation product from 1 molecular proportion of tertiary octylphenol and 8 molecular proportions of ethylene oxide. A clear solution is obtained which is suitable for use as a spray concentrate; it can be emulsified by being poured into water.

(A) To measure the contact effect on aphids the following test was carried out with the use of spray liquors containing respectively 0.08%, 0.04%, 0.02% and 0.01% of active principle.

Broad beans, strongly infested with aphids, were sprayed all over and after 48 hours the effect achieved was examined. When a 100% result was observed, the plants were infected with fresh aphids and the effect was examined after another 48 hours. The results obtained are summarized in the following table:

| Concentration of spray liquor | Effect on aphids | |
|---|---|---|
| | After 48 hours— Example 1 | 48 hours after reinfection— Example 1 |
| 0.08% | ++ | (″) |
| 0.04% | ++ | (″) |
| 0.02% | ++ | (″) |
| 0.01% | ++ | — — |

The symbols shown above, used for each plant, signify: + = no living aphids left; (′) = good effect, only few surviving aphids; — — = insufficient or no effect.

(B) To measure the effect on aphids by diffusion through the leaves the following test was made with the use of spray liquors containing respectively 0.08%, 0.04% and 0.02% of active principle.

Of broad beans infested with aphids only on the underside of the leaves, only the upper surface of the leaves was sprayed with the above-mentioned spray liquors and after 48 hours the effect was examined on the underside of the leaves. The results obtained are summarized in the following table:

| Concentration of spray liquor | Effect on aphids— Example 1 |
|---|---|
| 0.08% | ++++ |
| 0.04% | +++ |
| 0.02% | +++ |

If desired, the spray concentrates can be prepared with wetting and emulsifying agents other than those specified above. There may be used non-ionic products, for example condensation products from an aliphatic alcohol, amine or carboxylic acid containing a long-chain hydrocarbon residue of about 10 to 30 carbon atoms, with ethylene oxide, such as the condensation product of octadecyl alcohol with 25 to 30 molecular proportions of ethylene oxide, or from soybean fatty acid with 30 molecular proportions of ethylene oxide, or from commercial oleylamine with 15 molecular proportions of ethylene oxide, or from dodecylmercaptan with 12 molecular proportions of ethylene oxide. As suitable anion-active emulsifiers may be mentioned the sodium salt of dodecyl alcohol sulfonate, sodium dodecyl benzenesulfonate, the potassium or triethanolamine salts of oleic acid or of abietic acid, or mixtures of these acids, or the sodium salt of a petroleum sulfonic acid.

Instead of isopropanol other solvents may be used for the preparation of spray liquor concentrates, for example ethanol, methanol, butanol, acetone, methyl ethyl ketone, methyl cyclohexanol, benzene, toluene, xylene, kerosenes or petroleum fractions. Mixtures of different solvents are equally suitable.

*Example 3*

2 parts of the product obtained as described in Example 1 are mixed with 9 parts of chalk and 1 part of wetting agent. A dusting powder is obtained which on being suspended in water yields a liquid spray. When the walls of stables are treated with such a liquid spray, containing 0.4% of active principle, good effects against flies and midges can be achieved.

*Example 4*

A mixture of 9.8 parts of tetrolic acid methyl ester $CH_3C\equiv C.COOCH_3$ (B.P. 138–140° C.) and 18.6 parts of O,O-diethyl-dithiophosphoric acid is heated for 9 hours at 80° C. The reaction product is taken up in 100 parts by volume of chloroform and washed with twice 10 parts by volume of 2 N-sodium carbonate solution. The solution is dried over sodium sulfate and evaporated, to leave a pale-yellow oil (18.8 parts) which boils at 108 to 115° C. in a vacuum of 0.08 mm. Hg.

In the test described in Example 2, the resulting condensation product displays a good aphicidal effect, and it is also active as stomach poison on the common fly (*Musca domestica*).

*Example 5*

A mixture of 18.6 parts of O,O-diethyl-dithiophosphoric acid and 9.8 parts of propiolic acid ethyl ester $CH\equiv C.COOC_2H_5$ (B.P. 115 to 116° C.) is heated for 24 hours at 80° C. The condensation product is cooled and taken up in 50 parts by volume of chloroform, and the acid constituents are washed with 10 parts by volume of 2 N-sodium carbonate solution. The solution is dried over sodium sulfate and evaporated in vacuo. On being subjected to distillation in a high vacuum the residue yields 21.5 parts of a yellowish oil boiling at 110° C. under a pressure of 0.03 mm. Hg. The compound is an efficient aphicide and stomach poison against flies.

*Example 6*

When as described in Example 5, 15.8 parts of O,O-dimethyl-dithiophosphoric acid are reacted with 9.8 parts of propiolic acid ethyl ester, an adduct is obtained which boils at 110° C. under a pressure of 0.015 mm. Hg and can be used as contact poison against flies, such as *Musca domestica*.

*Example 7*

A mixture of 22.4 parts of O,O-diethyl-dithiophosphoric acid, 0.2 part of hydroquinone and 5 drops of triethylamine is treated with 17.4 parts of phenylpropiolic acid ethyl ester of the formula

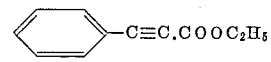

(B.P. 86 to 90° C. under 0.04 mm. Hg pressure), and the whole is heated for 16 hours at 60 to 70° C. The reaction product is taken up in 100 parts by volume of benzene and washed twice with 20 parts by volume of saturated sodium bicarbonate solution on each occasion. After the solvent has been removed in vacuo, there are obtained 28 parts of a condensation product in the form of a pale-yellow oil which cannot be distilled, of which less than 1% dissolved in water and which is miscible in all proportions with acetone and isopropanol. The compound is an efficient stomach poison against *Musca domestica, Carausius morosus* and more especially against *Gastroidea viridula*.

*Example 8*

A mixture of 19.0 parts of O,O-dimethyl-dithiophosphoric acid, 0.2 part of hydroquinone and 5 drops of triethylamine is heated with 14.2 parts of acetylene-dicarboxylic acid methyl ester of the formula $$CH_3OOC.C{\equiv}C.COOCH_3$$

(B.P. 100° C. under 11 mm. Hg pressure) for 22 hours at 60 to 70° C. The resulting oil is cooled, taken up in 100 parts by volume of benzene, washed in 10 parts by volume of saturated sodium bicarbonate solution and then freed from the solvent in vacuo. The residue (27.9 parts) is the adduct of dimethyl-dithiophosphoric acid with acetylene-dicarboxylic acid methyl ester, boiling at 126–129° C. under a pressure of 0.02 mm. Hg.

*Analysis.*—S calculated: 21.36%. Found: 21.82%.

*Example 9*

19.0 parts of O,O-dimethyl-dithiophosphoric acid, 0.2 part of hydroquinone, 5 drops of triethylamine and 20 parts of tetrolic acid Carbitol ester of the formula $$CH_3C{\equiv}C.COOC_2H_4OC_2H_4OC_2H_5$$

(B.P. 89 to 94° C. under a pressure of 0.01 mm. Hg) are mixed together and heated for 24 hours at 60 to 70° C. The reaction product is then taken up in 50 parts by volume of methylene chloride and washed with saturated sodium bicarbonate solution, the whole is dried over sodium sulfate and the methylene chloride is distilled off in vacuo, to yield 31.6 parts of a dark-yellow oil which cannot be distilled without decomposing; it is sparingly soluble in water but very readily soluble in acetone and isopropanol.

*Analysis.*—P calculated: 8.64%. Found: 8.7%.

In the test described in Example 2, the above condensation product displays very good sphicidal effects.

*Example 10*

When, as described in Example 9, 22.6 parts of O,O-diethyl-dithiophosphoric acid are reacted with 20 parts of tetrolic acid Carbitol ester, there are obtained 28.75 parts of an adduct of which less than 1% is soluble in water and which is very readily soluble in acetone and isopropanol.

Analysis.—P calculated: 8.2%. Found: 7.2%.

In the test described in Example 2 under A, the above condensation product displays a very good aphicidal effect.

*Example 11*

When, as described in Example 9, 19.0 parts of O,O-dimethyl-dithiophosphoric acid are reacted with 18.6 parts of the propiolic acid Carbitol ester of the formula $$CH{\equiv}C.COOC_2H_4OC_2H_4OC_2H_5$$

(B.P. 74 to 76° C. under a pressure of 0.01 mm. Hg), 25.9 parts of an adduct are obtained which is sparingly soluble in water and very readily soluble in acetone and isopropanol.

*Analysis.*—P calculated: 9:00%. Found: 9.7%.

The compound is an efficient stomach poison against *Carausius morosus* and *Gastroidea viridula*.

*Example 12*

When, as described in Example 9, 22.4 parts of O,O-diethyl-dithiophosphoric acid are reacted with 18.6 parts of propiolic acid Carbitol ester, 28.5 parts of an adduct are obtained which is hardly at all soluble in water but very readily soluble in acetone and isopropanol.

*Analysis.*—P calculated: 8.32%. Found: 8.2%.

The above compound is an efficient aphicide and stomach poison against *Musca domestica* and *Gastroidea viridula*.

*Example 13*

A mixture of 19.0 parts of O,O-dimethyl-dithio-phosphoric acid, 0.2 part of hydroquinone and 5 drops of triethylamine is treated with 17.0 parts of butinediol-(1:4)-diacetate of the formula $$CH_3COOCH_2C{\equiv}C.CH_2OOCCH_3$$

(B.P. 60 to 62° C. under a pressure of 0.01 mm. Hg) and heated for 24 hours at 60 to 70° C. The reaction product is diluted with 50 parts by volume of methylene chloride, and the solution is washed with saturated sodium bicarbonate solution, dried over sodium sulfate, and the solvent is then evaporated in vacuo at a bath temperature of 90° C. Yield: 23.6 parts of an adduct of which less than 1% is soluble in water but which is very readily soluble in acetone and isopropanol.

*Analysis.*—P calculated: 9.44%. Found: 9.2%.

The product is a very efficient stomach poison against *Musca domestica*.

*Example 14*

When, as described in Example 13, 22.4 parts of O,O-diethyl-dithiophosphoric acid are reacted with 17.0 parts of butinediol-(1:4)-diacetate, 21.2 parts of an adduct are obtained which is hardly at all soluble in water but very readily soluble in acetone and isopropanol.

*Analysis.*—P calculated: 8.69%. Found: 8.1%.

*Example 15*

A mixture of 19.0 parts of O,O-dimethyl-dithiophosphoric acid, 0.2 part of hydroquinone and 5 drops of triethylamine in 50 parts by volume of acetone is treated at 30 to 40° C. within 20 minutes, while being cooled with water, dropwise with 13.0 parts of phenylpropargyl aldehyde of the formula

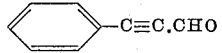

(B.P. 108 to 112° C. under a pressure of 14 mm. Hg). On completion of the dropwise addition the cooling means is removed. The temperature of the mixture then rises to 48° C. and subsequently drops again. The mixture is stirred for 1 hour at 60 to 70° C., allowed to cool, the solution is mixed with 300 parts by volume of water, the oil is separated and the water is extracted with methylene chloride. The oil is combined with the methylene chloride extract, washed with saturated sodium bicarbonate solution and then dried over sodium sulfate. Evaporation of the solution in vacuo at 90° C. yields as a residue 27.7 parts of an adduct. The viscid oil is hardly at all soluble in water but very readily soluble in acetone and isopropanol.

*Analysis:*—P calculated: 10.75%. Found: 10.5%.

The compound has an ovicidal action on the eggs of *Ephestia kuehniella*.

*Example 16*

When, as described in Example 15, 22.4 parts of O,O-diethyl-dithiophosphoric acid are reacted with 13 parts of phenylpropargyl aldehyde, an adduct is obtained in the form of a viscid oil (25.9 parts) which is hardly at all soluble in water but very readily soluble in acetone and isopropanol.

*Analysis.*—P calculated: 9.79%. Found: 9.7%.

The compound has aphicidal properties.

*Example 17*

A mixture of 19.0 parts of O,O-dimethyl-dithiophosphoric acid, 0.2 part of hydroquinone, 5 drops of triethylamine and 10 parts of propargyl methyl ether of the formula $$CH{\equiv}C.CH_2OCH_3$$

(B.P. 60° C.) is heated for 24 hours at a bath temperature of 70 to 80° C., then taken up in 100 parts by volume of methylene chloride, and the solution is washed with saturated sodium bicarbonate solution, dried over sodium sulfate, and the readily volatile constituents are evaporated in vacuo at 60° C., to yield an adduct in the form of a bright, mobile oil which boils at 89–120° C. under a pressure of 0.05 mm. Hg.

*Analysis.*—P calculated: 13.57%. Found: 13.3%.

In the test described in Example 2 the above condensation product displays very good aphicidal action, and it also acts as a stomach poison against the common fly (*Musca domestica*).

Example 18

When, as described in Example 17, 22.4 parts of O,O-diethyl-dithiophosphoric acid are reacted with 10 parts of propargyl methyl ether, 24.0 parts of an adduct are obtained which boils at 104 to 110° C. under a pressure of 0.04 mm. Hg.

*Analysis.*—P calculated: 12.09%. Found: 12.15%.

Example 19

A mixture of 17.04 parts of O,O-dimethyl-thiophosphoric acid $(CH_3O)_2P(O)SH$, 0.2 part of hydroquinone, 5 drops of triethylamine and 9.8 parts of tetrolic acid methyl ester is heated for 24 hours at 60 to 70° C. The reaction product is taken up in 100 parts by volume of methylene chloride, and the solution is washed with saturated sodium bicarbonate solution, dried over sodium sulfate, and the readily volatile constituents are removed in vacuo at 90° C. As residue there are obtained 11 parts of an adduct which can be distilled in a high vacuum. B.P. 62 to 64° C. under a pressure of 0.01 mm. Hg.

*Analysis.*—P calculated: 12.90%. Found 12.7%.

Example 20

When, as described in Example 19, 20.4 parts of O,O-diethyl-thiophosphoric acid $(C_2H_5O)_2P(O)SH$ are reacted with 9.8 parts of tetrolic acid methyl ester, 15.1 parts of an adduct are obtained which boils at 123 to 129° C. under a pressure of 0.06 mm. Hg.

*Analysis.*—P calculated: 11.55%. Found: 10.9%.

What is claimed is:

1. The compound of the formula $$\begin{array}{c} CH_3-O \\ \phantom{CH_3-O}\diagdown \\ \phantom{CH_3-O}\diagup P-S-\underset{\phantom{|}}{\overset{CH_3}{\underset{|}{C}}}=\underset{\phantom{|}}{\overset{H}{\underset{|}{C}}}-C\diagup\overset{O}{\diagdown}O-CH_3 \\ CH_3-O \phantom{\diagup}\underset{S}{\|} \end{array}$$

2. The compound of the formula $$\begin{array}{c} CH_3-O \\ \phantom{CH_3-O}\diagdown P-S-\underset{\|}{\overset{CH_3}{\underset{|}{C}}} \\ CH_3-O \phantom{\diagup}\underset{S}{\|} \phantom{P-S-}\underset{\underset{COOC_2H_4OC_2H_4OC_2H_5}{|}}{CH} \end{array}$$

3. The compound of the formula $$\begin{array}{c} CH_3-O \\ \phantom{CH_3-O}\diagdown P-S-CH \\ CH_3-O \phantom{\diagup}\underset{S}{\|} \phantom{P-S-}\underset{\underset{CH_2OCH_3}{|}}{\overset{\|}{CH}} \end{array}$$

4. A preparation for combating pests which comprises in admixture with an inert and compatible carrier a phosphorus compound as defined in claim 1.

5. A preparation for combating pests which comprises in admixture with an inert and compatible carrier a phosphorus compound as defined in claim 2.

6. A preparation for combating pests which comprises in admixture with an inert and compatible carrier a phosphorus compound as defined in claim 3.

7. The method of controlling animal pests on plants which comprises applying to plants that are subject to attack by animal pests a pesticidal amount of the compound of the formula $$\begin{array}{c} CH_3-O \\ \phantom{CH_3-O}\diagdown P-S-\overset{CH_3}{\underset{|}{C}}=\overset{H}{\underset{|}{C}}-C\diagup\overset{O}{\diagdown}O-CH_3 \\ CH_3-O \phantom{\diagup}\underset{S}{\|} \end{array}$$

8. The method of controlling animal pests on plants which comprises applying to plants that are subject to attack by animal pests a pesticidal amount of the compound of the formula $$\begin{array}{c} CH_3-O \\ \phantom{CH_3-O}\diagdown P-S-\overset{CH_3}{\underset{|}{C}} \\ CH_3-O \phantom{\diagup}\underset{S}{\|} \phantom{P-S-}\underset{\underset{COOC_2H_4OC_2H_4OC_2H_5}{|}}{CH} \end{array}$$

9. The method of controlling animal pests on plants which comprises applying to plants that are subject to attack by animal pests a pesticidal amount of the compound of the formula $$\begin{array}{c} CH_3-O \\ \phantom{CH_3-O}\diagdown P-S-CH \\ CH_3-O \phantom{\diagup}\underset{S}{\|} \phantom{P-S-}\underset{\underset{CH_2OCH_3}{|}}{\overset{\|}{CH}} \end{array}$$

10. The compound of the formula $$\left(C_2H_5O\right)_2-\underset{\underset{S}{\|}}{P}-S-\overset{CH_3}{\underset{|}{C}}=CH-C\diagup\overset{O}{\diagdown}OCH_3$$

11. The compound of the formula $$\left(C_2H_5O\right)_2-\underset{\underset{S}{\|}}{P}-S-\overset{CH_3}{\underset{|}{C}}=CH-COOC_2H_4OC_2H_4OC_2H_5$$

12. The compound of the formula $$\left(C_2H_5O\right)_2-\underset{\underset{S}{\|}}{P}-S-\overset{H}{\underset{|}{C}}=CH-COOC_2H_4OC_2H_4OC_2H_5$$

13. The compound of the formula $$\left(C_2H_5O\right)_2-\underset{\underset{S}{\|}}{P}-S-\overset{H}{\underset{|}{C}}=CH-CH_2-O-CH_3$$

14. A preparation for combating pests which comprises in admixture with a major proportion of an inert and compatible carrier a phosphorus compound as defined in claim 10.

15. A preparation for combating pests which comprises in admixture with a major proportion of an inert and compatible carrier a phosphorus compound as defined in claim 11.

16. A preparation for combating pests which comprises in admixture with a major proportion of an inert and compatible carrier a phosphorus compound as defined in claim 12.

17. A preparation for combating pests which comprises in admixture with a major proportion of an inert and compatible carrier a phosphorus compound as defined in claim 13.

18. The method of controlling animal pests on plants which comprises applying to plants that are subject to attack by animal pests a pesticidal amount of the compound of the formula $$\left(C_2H_5O\right)_2-\underset{\underset{S}{\|}}{P}-S-\overset{CH_3}{\underset{|}{C}}=CH-C\diagup\overset{O}{\diagdown}OCH_3$$

19. The method of controlling animal pests on plants which comprises applying to plants that are subject to attack by animal pests a pesticidal amount of the compound of the formula $$\left(C_2H_5O\right)_2-\underset{\underset{S}{\|}}{P}-S-\overset{CH_3}{\underset{|}{C}}=CH-COOC_2H_4OC_2H_4OC_2H_5$$

20. The method of controlling animal pests on plants which comprises applying to plants that are subject to attack by animal pests a pesticidal amount of the compound of the formula

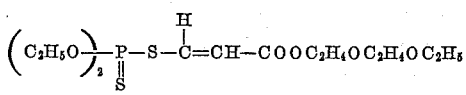

21. The method of controlling animal pests on plants which comprises applying to plants that are subject to attack by animal pests a pesticidal amount of the compound of the formula

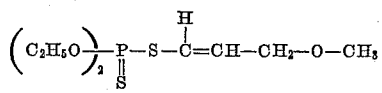

References Cited in the file of this patent

UNITED STATES PATENTS

| | | |
|---|---|---|
| 2,864,741 | Diveley | Dec. 16, 1958 |
| 2,894,014 | Stiles et al. | July 7, 1959 |
| 2,895,982 | Stiles et al. | July 21, 1959 |
| 2,912,450 | McConnell et al. | Nov. 10, 1959 |
| 3,067,232 | Baker | Dec. 4 1962 |

FOREIGN PATENTS

| | | |
|---|---|---|
| 448,123 | Italy | May 10, 1949 |

OTHER REFERENCES

Casida et al.: "J. Agr. Food Chem.," 4, pages 236–243 (1956).